(12) United States Patent
Baliva et al.

(10) Patent No.: US 11,926,173 B2
(45) Date of Patent: Mar. 12, 2024

(54) SENSORISED WHEEL HUB UNIT FOR VEHICLES, ASSOCIATED SYSTEM AND METHOD FOR DETECTING FINAL LOADS ON WHEELS

(71) Applicant: Aktiebolaget SKF, Gothenburg (SE)

(72) Inventors: Simone Baliva, Saluzzo (IT); Marco Cambiano, Cumiana (IT); Alessandro Ferrero, Turin (IT); Alessandro Garrone, Pino Torinese (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 18/093,369

(22) Filed: Jan. 5, 2023

(65) Prior Publication Data

US 2023/0143792 A1 May 11, 2023

Related U.S. Application Data

(63) Continuation of application No. 17/408,705, filed on Aug. 23, 2021, now Pat. No. 11,571,928.

(30) Foreign Application Priority Data

Aug. 28, 2020 (IT) .......................... 102020000020608

(51) Int. Cl.
*F16C 41/00* (2006.01)
*B60B 27/00* (2006.01)
(Continued)

(52) U.S. Cl.
CPC ........ *B60B 27/0068* (2013.01); *F16C 19/522* (2013.01); *F16C 41/007* (2013.01); *G01L 5/0019* (2013.01); *F16C 2326/02* (2013.01)

(58) Field of Classification Search
CPC .. F16C 19/522; F16C 41/007; F16C 2233/00; F16C 2326/02; B60B 27/0068; G01L 5/0019
See application file for complete search history.

(56) References Cited

U.S. PATENT DOCUMENTS 4,203,319 A * 5/1980 Lechler ................ G01L 5/0019
73/862.541
6,619,102 B2 9/2003 Salou et al.
(Continued)

FOREIGN PATENT DOCUMENTS

FR 3001508 8/2014

OTHER PUBLICATIONS

Search Report for corresponding Italian Patent Application No. 102020000020608 dated May 12, 2021.
U.S. Appl. No. 17/408,705.

*Primary Examiner* — Alan B Waits
(74) *Attorney, Agent, or Firm* — Reed Smith LLP

(57) ABSTRACT

Sensorised wheel hub unit and a method for detecting, in real time, forces and moments applied to an outer ring of the wheel hub unit in which piezoresistive ceramic plates are made of one piece with welded metal plates housed within respective recesses formed in an outer surface of the outer ring over respective races for rolling elements that there is a gap between the plates and a base wall of each recess; the temperature of the outer ring and the amplitude and frequency of first electrical signals (S1) associated with the sensors relating to the same race are analysed to determine a frequency value equal to the frequency of the first signal having the maximum amplitude and as many amplitude values (D1-Dn) as there are sensors associated with that race and each equal to the maximum amplitude of the first signal from each sensor, corrected according to temperature.

14 Claims, 8 Drawing Sheets

(51) Int. Cl.
*F16C 19/52* (2006.01)
*G01L 5/00* (2006.01)

(56) References Cited

U.S. PATENT DOCUMENTS

| | | |
|---|---|---|
| 6,658,934 B1 | 12/2003 | Housey et al. |
| 6,658,943 B2 | 12/2003 | McDearmon |
| 11,453,239 B2 * | 9/2022 | Bertola ................. G01L 5/0019 |
| 2008/0095483 A1 | 4/2008 | Duret et al. |
| 2009/0252444 A1 | 10/2009 | Duret et al. |
| 2011/0214513 A1 * | 9/2011 | Ikki ..................... B60B 27/0068 |
| | | 73/862.045 |
| 2014/0212081 A1 * | 7/2014 | Takahashi ............. G01L 5/0019 |
| | | 384/448 |
| 2015/0267742 A1 * | 9/2015 | Hatakeyama ....... B60B 27/0005 |
| | | 384/448 |
| 2021/0170789 A1 * | 6/2021 | Bertola ............... B60B 27/0068 |
| 2022/0063329 A1 * | 3/2022 | Baliva ................... F16C 19/184 |
| 2022/0126628 A1 * | 4/2022 | Dop .................... B60B 27/0005 |
| 2022/0307604 A1 | 9/2022 | Wu et al. |

* cited by examiner

SENSORISED WHEEL HUB UNIT FOR VEHICLES, ASSOCIATED SYSTEM AND METHOD FOR DETECTING FINAL LOADS ON WHEELS

CROSS-REFERENCE TO RELATED APPLICATIONS

This application is a continuation of, and claims the benefit under 35 U.S.C. § 120 of the earlier filing date of, copending U.S. Ser. No. 17/408,705 filed Aug. 23, 2021, which is based on and claims priority to Italian Patent Application No. 102020000020608 filed on Aug. 28, 2020, under 35 U.S.C. § 119, the disclosures of which are incorporated by reference herein.

FIELD

The present disclosure relates to a sensorised wheel hub unit for vehicles.

BACKGROUND

In the suspension units currently in use, sensors are capable of detecting the rotation speed of each wheel of a vehicle.

BRIEF DESCRIPTION OF THE DRAWINGS

Embodiments in accordance with this disclosure will now be described with reference to the accompanying drawings illustrating a non-limiting embodiment in which.

DETAILED DESCRIPTION

Figure 1:
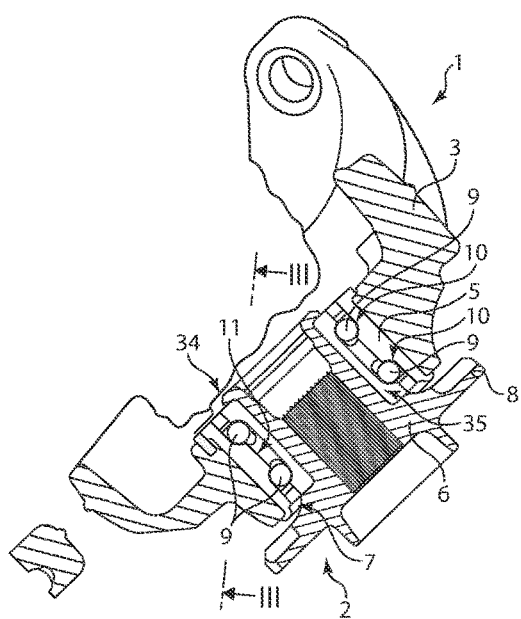
FIG. 1 diagrammatically illustrates, in side elevation and partly radial cross-section, a view of a vehicle suspension assembly equipped with a sensorised wheel hub unit in accordance with this disclosure.
Figure 3:
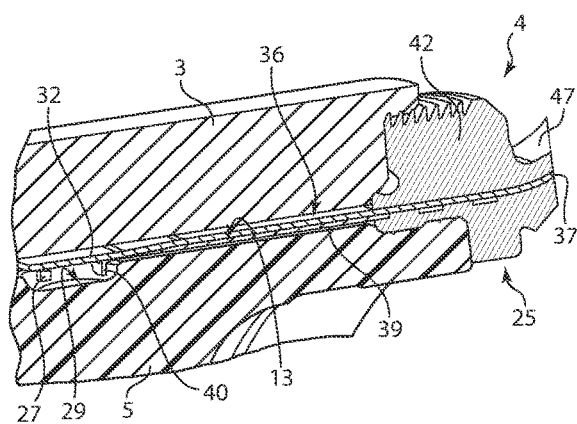
FIG. 3 diagrammatically illustrates, on a further enlarged scale, a detail of a view of the vehicle suspension assembly in FIG. 1 in cross-section along the line III-III.

While known sensors that are actually in use in vehicles are capable of detecting the rotation speed of each wheel of a vehicle, no use is made of sensorised suspension units capable of detecting the stresses arising from the different driving conditions of the vehicle upon the wheel hub unit on which the vehicle's wheel is mounted, e.g., those due to the roughness or different conditions of the surface over which the vehicle is moving, and/or the manoeuvres performed, e.g. steering, braking, etc.

U.S. Pat. No. 6,619,102B2 describes a wheel hub unit consisting of a rolling bearing, an outer ring having a flange for attachment to the suspension strut, provided with circumferential and radial elastic deformation zones to each of which a single deformation sensor is applied. This solution is complex and costly to implement and has not proved effective for correctly detecting the forces acting on the wheel hub unit.

U.S. Pat. No. 6,658,943B2 describes a double-row tapered roller bearing in which the radially outer cylindrical lateral surface of the bearing outer ring is provided with four angularly spaced sensor modules fixed circumferentially on the cylindrical surface. Each module consists of a pair of strain sensors positioned at 90° to each other. Again, this solution has also not proved to be effective in correctly detecting the forces acting upon it.

These solutions use, as sensor modules, strain gauges generally adhesively bonded to the surfaces to be detected, a solution which has proved to be ineffective and above all unreliable, and which requires successive recalibrations of the sensor. In effect, all known systems are only suitable for testing, and are not suitable for, or compatible with, series production.

This disclosure is directed to improved sensorised wheel hub units for vehicles. This disclosure further relates to a detection system and an associated method for accurately detecting the forces and moments applied to the wheel hub unit in real time so as to provide the vehicle control unit with useful information to improve control of stability and make it more effective, as well as usable for the better management of autonomous driving functions.

With reference to FIGS. 1 to 4, the reference numeral 1 relates to a vehicle suspension assembly as a whole, which includes a sensorised wheel hub unit 2 and a suspension strut or articulation 3 for a wheel hub unit 2. A wheel hub unit 2, which is configured to couple with a suspension strut or articulation 3, includes a detection system 4 (FIG. 2) configured to detect mechanical stresses such as loads, in particular forces and moments (torques), acting on a wheel hub unit 2.

Some embodiments of a wheel hub unit 2 include a rolling bearing 34 in turn comprising a radially outer ring 5 and a radially inner ring 35, an annular flanged hub 6 radially coaxially inserted on the inside of the radially outer ring 5 and immobilisably angularly coupled to the inner ring 35 and a plurality of rolling elements 9 (FIG. 1) inserted between the outer ring 5 and the flanged hub 6, in this case between the outer ring 5 and the inner ring 35, in order to cause the flanged hub 6 to be able to rotate with respect to the outer ring 5, which is stationary when in use since it is linked/attached to the suspension strut or articulation 3. In this way, a flanged hub 6 is inserted so it idles coaxially inside the outer ring 5.

In particular, the flanged hub 6 is inserted into the radially outer ring 5 of the rolling bearing 34 from the side of a first extremity 7 (FIGS. 1 and 2) of the outer ring 5 which in use faces towards the outside of the vehicle and, in the example illustrated, towards a flange 8 of the hub 6 radially extending beyond the outside of the hub 6. In the illustrated non-limiting example, the rolling elements 9 consist of two ball bearings 9. In other embodiments the rolling elements may be cylindrical or tapered or any suitable rolling element as one will appreciate upon reading this disclosure in its entirety.

Figure 2:
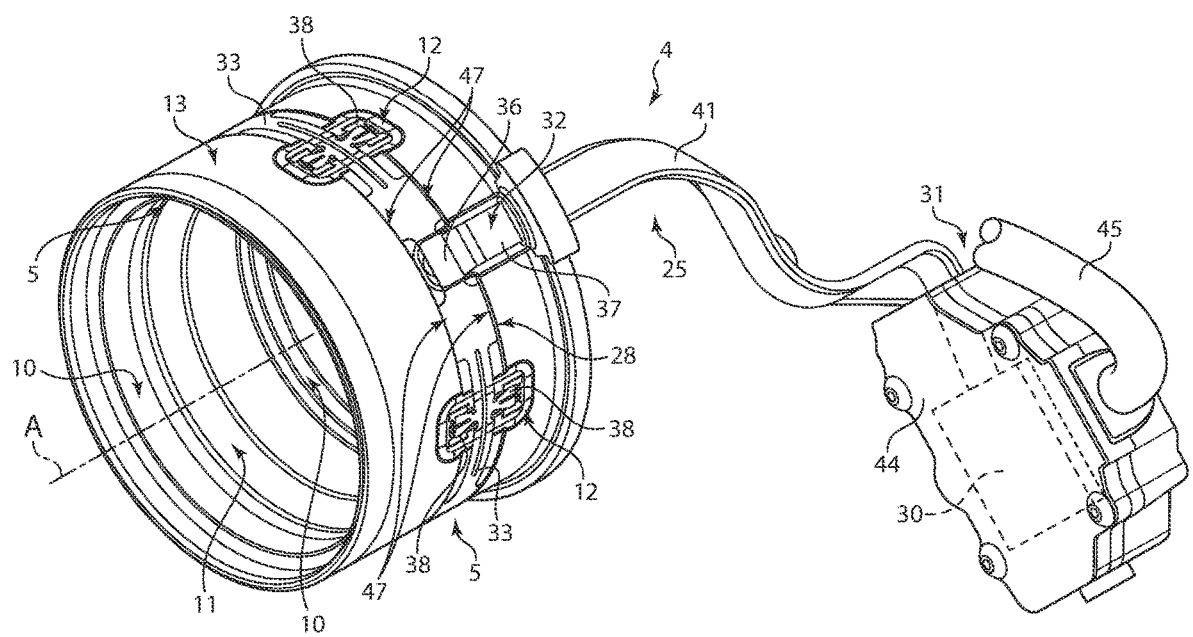
FIG. 2 diagrammatically illustrates, on an enlarged scale, a three-quarter front perspective view of the detection system in accordance with this disclosure, including an outer ring of the wheel hub unit in FIG. 1.

In any event, the rolling elements 9 are configured to engage two respective annular races 10 formed radially on the inside of the outer ring 5, on its radially inner lateral surface 11, which in the illustrated example is substantially cylindrical, as illustrated diagrammatically in FIGS. 1 and 2.

In a known way, the rolling elements 9 also engage corresponding annular races, which are known and for simplicity not described, formed radially on the outside of the inner ring 35 or, if this is not present, directly on the hub 6.

Figure 5:
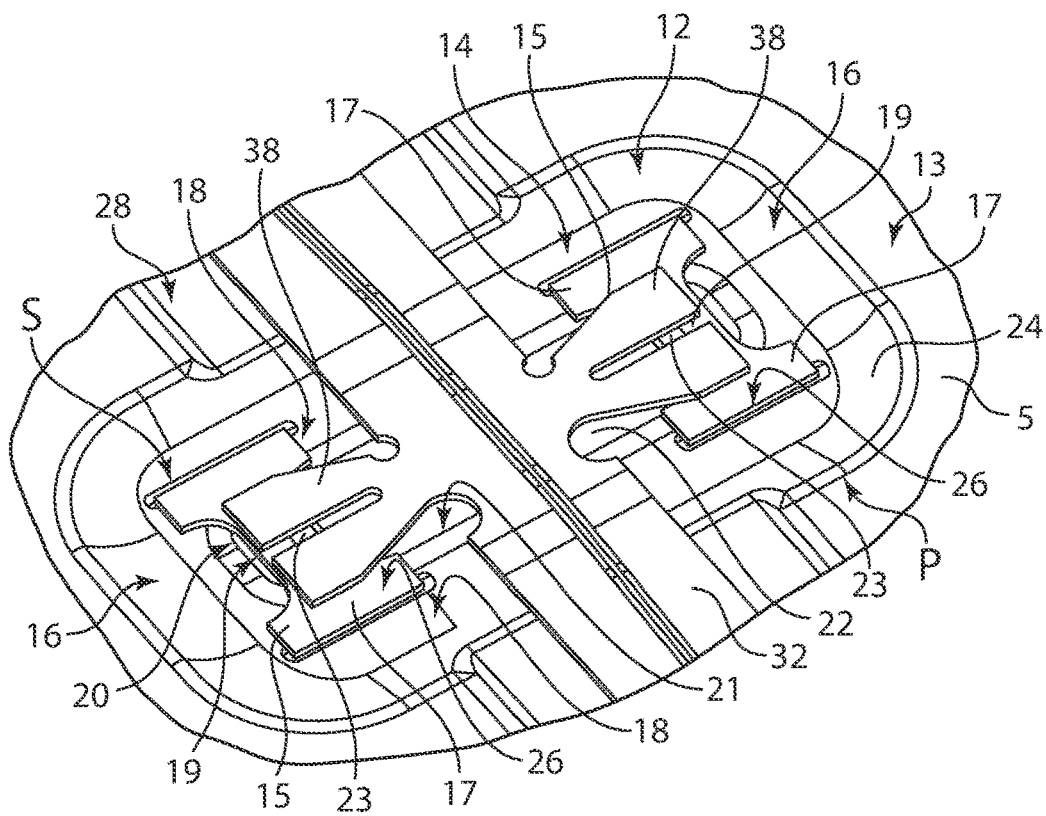
FIG. 5 diagrammatically illustrates, on an enlarged scale, a perspective view of a detail of the outer ring of a wheel hub unit forming part of the detection system in FIG. 2.
Figure 6:
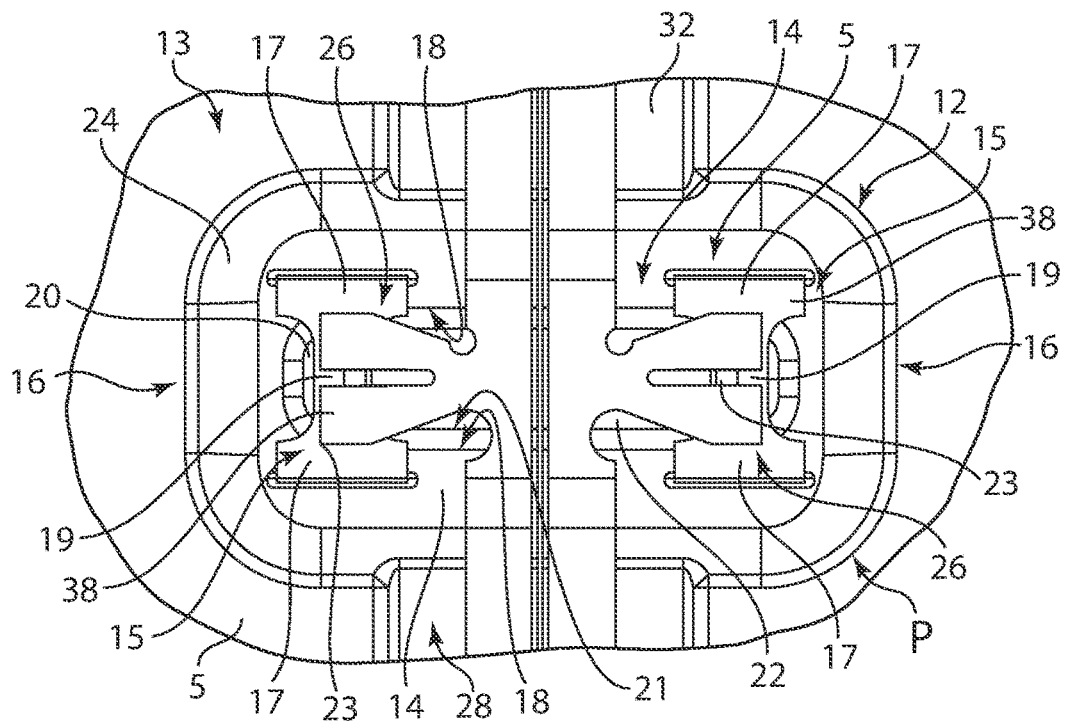
FIG. 6 diagrammatically illustrates a plan view from above of the same detail as in FIG. 5.

According to some embodiments, the detection system 4 comprises a plurality of longitudinal concave recesses 12 (FIGS. 2, 5 and 6) formed axially in a radially outer cylindrical lateral surface 13 of the outer ring 5, spaced angularly apart from each other.

Each recess 12, which thus forms an integral part of the outer ring 5, extends over an annular race 10 for the rolling elements 9, in the non-limiting but preferred embodiment illustrated over both races 10, in a circumferential direction relative to them, thus circumferentially over each race 10.

Here and hereafter, the term "circumferentially" with respect to the recesses 12 is to be understood as extending so as to "cover" a respective circumferential section of each race 10, irrespective of whether a recess 12 is shaped so as to have a curvature parallel to that of the surface 13 or forms a flat portion oriented parallel to a geometric chord of the surface 13. The recesses 12 are configured to define corresponding zones of localised elastic deformation in the outer ring 5.

In the embodiment illustrated, four recesses 12 are provided on the outer lateral surface 13, spaced at regular angular intervals, thus arranged at 90° from each other. The recesses 12 could however be present in a different, greater or lesser, number (at least two) and be arranged with non-identical angular intervals between them, some circumferentially closer to others, depending on specific requirements relating to the geometry of the suspension assembly 1.

Figure 13:
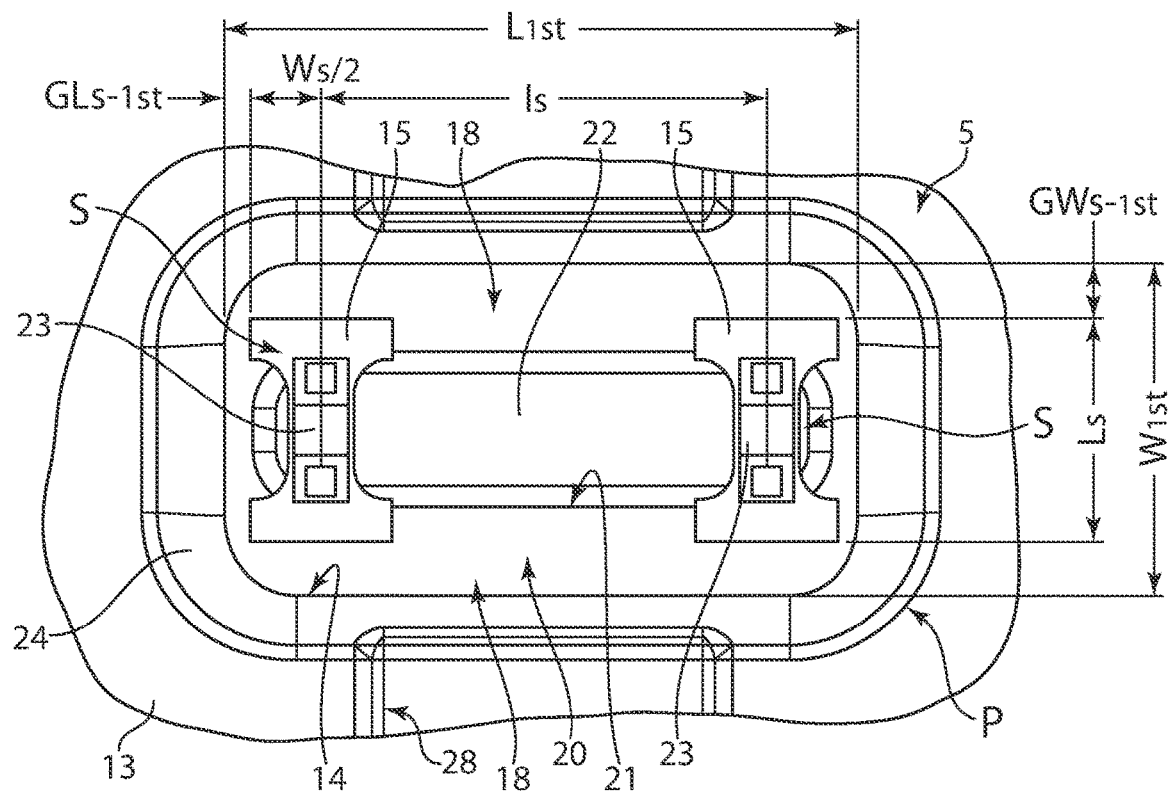
FIG. 13 illustrates a plan view radially from outside the outer ring in FIG. 12.

According some embodiments and also with reference to FIG. 13, a detection system 4 further comprises a first annular step 14, formed peripherally within each recess 12 along the whole perimeter P of the recess 12 and in a position immediately adjacent to the perimeter P.

Figure 12:
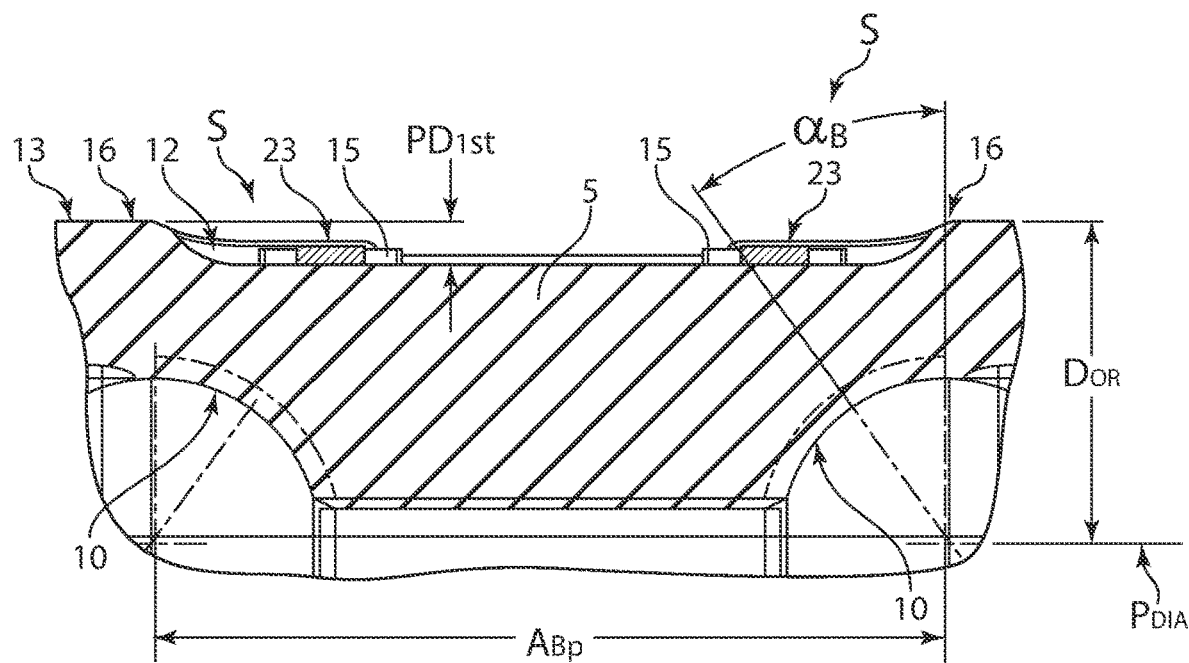
FIG. 12 diagrammatically illustrates, on an enlarged scale, a radial longitudinal cross-section of an outer ring of the wheel hub unit in FIG. 1.

For each recess 12, such a detection system 4 further comprises at least one metal plate 15 located transversely within each recess 12, thus oriented in a circumferential direction with respect to the outer ring 5, so as to be substantially aligned circumferentially with an annular race 10. In the example illustrated, there are therefore two metal plates 15, housed transversely within each recess 12, parallel to each other and close to opposite axial ends 16 of corresponding recess 12 (FIGS. 5, 12 and 13), each metal plate 15 being substantially aligned circumferentially over a corresponding race 10, in particular over a circumference which can be traced on race 10 where the points of contact between the balls 9 and the race 10 lie.

According some embodiments, circumferentially opposite extremities 17 of each metal plate 15 (in the meaning defined above, that is aligned with each other in a circumferential direction with respect to the ring 5) are welded to opposite lateral sides 18 of the first step 14. This method of attachment by welding, in contrast to other possible methods, such as adhesive bonding, has proved to be surprisingly more effective in ensuring the reliability of the results provided by the detection system 4, as will be seen, as well as improving the process of manufacturing the outer ring 5 with at least part of the detection system 4 incorporated with it.

In plan, the metal plates 15 may preferably be in the shape of an "H" oriented in an axial direction (FIGS. 5, 6 and 10), having a middle portion 19 of narrow width with respect to the outer ring 5 in an axial direction connecting the two extremities 17, thus forming the crossbar of the H, while the stems of the H are formed by the opposite extremities 17 of the plate 15.

Figure 10:
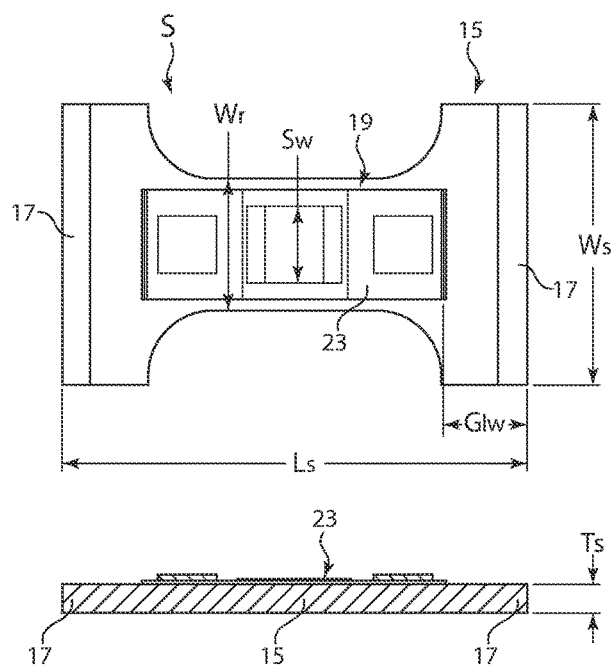
FIG. 10 diagrammatically illustrates, on an enlarged scale, two views at right angles, in plan (above) and in elevation (below), of a sensor constructed in accordance with this disclosure.
Figure 11:
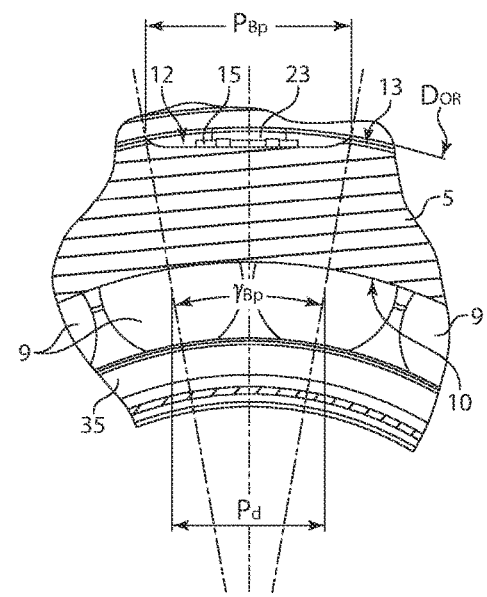
FIG. 11 diagrammatically illustrates a radial cross-section of the sensorised wheel hub unit in FIG. 1.

With reference to FIGS. 10 and 11, the extremities 17 have a width Ws in an axial direction with respect to the outer ring 5 that is larger than the width Wr of the middle portion 19, again measuring this width in an axial direction with respect to the outer ring 5. In certain embodiments, following relationship is preferred:

$$0.4 \leq \frac{W_r}{W_S} \leq 0.6 \qquad [01]$$

Furthermore, with particular reference to FIG. 11, according to certain embodiments, following relationship is preferred:

$$0.25 \leq \frac{L_S}{P_{Bp}} \leq 0.75 \qquad [02]$$

where: Ls is the length of the plates 15 between their opposite extremities 17 and $P_{Bp}$ is the geometric projection onto the recesses 12 of the circumferential pitch Pa of the balls 9 within the solid angle defined by the angular pitch $\gamma_{Bp}$ of the balls 9 themselves.

In addition, the thickness Ts (in mm) of the plates 15 must comply with the following relationships:

$$0.3 \leq Ts \leq 0.6 \text{ and } \frac{T_S}{L_S} \leq 0.1 \qquad [03]$$

According to one aspect of embodiments in accordance with this disclosure, the detection system 4 also includes a hollow 20 formed centrally within each recess 12 and bounded perimeterally by the first annular step 14 so as to form a second step 21 inside the first step 14 within the recess 12, delimiting a base wall 22 of the recess 12.

In embodiments in accordance with this disclosure, the base wall 22 of the hollow 20 is flat and parallel to a geometric chord of the curved cylindrical surface 13, and the steps 14 and 21 are also bounded by flat surfaces parallel to said geometric chord. However, the recesses 12 may also be made curved, rather than flat, so that the base wall 22 may be curved and parallel to the curvature of the lateral surface 13 in which the recesses 12 are formed, just as the surfaces bounding the steps 14 and 21 may also be curved and parallel to the surface 13.

In embodiments in accordance with this disclosure, each metal plate 15 spans the hollow 20, but is spaced apart from it and the base wall 22 thereof.

In particular, in the non-limiting example illustrated, the narrow central portion 19 of each metal plate 15 spans the hollow 20 and is spaced apart from it.

In this way, there is always a predetermined gap between each plate 15 and the base wall 22 of each recess 12, as a result of which, no metal plate 12 ever touches the base wall 22 of the respective recess 12, even when there is localised elastic deformation in the race section 10 below the recess 12, due for example to the passage of the rolling elements 9 under particularly severe local loading conditions.

The detection system 4 comprises a load sensor S for each metal plate 15, and, this sensor consists of a plate 23 of piezoresistive ceramic material (FIGS. 5 and 6) made to be of one piece with the metal plate 15, preferably spanning the narrow middle portion 19 of the metal plate 15, when present, and in any event positioned to span the hollow 20.

The use of piezoresistive ceramic plates structurally incorporated with the metal plates 15, instead of strain gauges as in the known art, has proved to be successful in achieving high reliability for the detection system 4 and easy industrialisation of it and the corresponding outer ring 5 with which it is incorporated.

Preferably, the ceramic plates 23 are obtained by the direct deposition of piezoresistive ceramic material onto the corresponding plates 15, for example on the narrow middle portion 19, and as far as near to the opposite extremities 17 of each metal plate 15, for example by means of screen printing or any other suitable method.

In plan, the recesses 12 have a rectangular shape with rounded edges defined by a flared edge 24, rounded so as to adopt a curved concave shape bounding the perimeter P, from which the first annular step 14 and then the hollow 20 defining the second step 21 forming the base wall 22 depart in succession from the edge 24 towards the centre of the recess 12.

The recesses 12 therefore have a depth in the radial direction (with respect to an axis of symmetry A of the outer ring 5—FIG. 2) defined by the sum of the height from the edge 24 to the step 14 and the height of the next step 21 formed by the hollow 20, up to the base wall 22.

The recesses 12 may be of identical depth, or some recesses 12 may be to a greater or lesser extent deeper than others, bearing in mind that when in use the greater the depth of a recess 12, the greater will be the electrical signal associated with the load sensors defined by the ceramic plates 23 and the respective metal plates 15 housed within that recess 12, and, on the other hand, the greater will be the structural weakening caused to the outer ring 5 by the presence of the recesses 12.

Thus, using recesses 12 of different depths can mediate between these two opposing requirements.

In embodiments in accordance with this disclosure, the depth of the recesses 12 (FIG. 12) must nevertheless comply with the following relationship:

$$0.05 \cdot \left( \frac{(D_{OR} - P_{Dia})}{2\cos(\alpha_B)} - R_{Ball} \right) \cdot \cos(\alpha_B) \leq \quad [04]$$

$$P_{D1st} \leq 0.4 \cdot \left( \frac{(D_{OR} - P_{Dia})}{2\cos(\alpha_B)} - R_{Ball} \right) \cdot \cos(\alpha_B)$$

where: $D_{OR}$ is the outer diameter of the outer ring 5, $P_{Dia}$ is the "Ball Pitch Diameter", that is the diameter of the circumference on which the geometric centres of the balls 9 lie, $R_{Ball}$ is the radius of the balls 9, $\alpha_B$ is the angle formed between the point of contact between the balls 9 and the radial perpendicular to the axis A and $P_{D1st}$ is specifically the depth of a recess 12, which must therefore be between 0.05 and 0.4 times the difference between the diameter of the external surface 13 of the outer ring 5 $D_{OR}$ and the point of ball-race contact in a radial direction given by the difference $[(D_{OR}-P_{Dia})/2 \cos(\alpha_B)-R_{Ball}]$ along the direction defined by the contact angle $(\alpha_B)$.

As already seen, in some embodiments, the wheel hub unit 2 is provided with a radially outer ring 5 having a pair of races 10 for rolling elements 9, arranged axially in tandem, and each ceramic load sensor S has a plate 23 of piezoresistive material fixed onto a respective metal plate 15, for example spanning the narrow intermediate portion 19, when present.

In addition, each recess 12 accommodates within it a pair of metal plates 15 arranged parallel to each other and positioned substantially circumferentially and axially in relation to the pair of races 10 with the plates 23 spanning the hollows 20.

Thus, in this preferred embodiment, the outer ring 5 is provided with four recesses 12, identically or differently spaced apart from each other by the same or different angles.

In embodiments in accordance with this disclosure, the axial distance or "pitch" or spacing $I_S$ between two sensors S housed in the same recess 12 must comply with the following relationship (FIGS. 12 and 13):

$$0.8 \cdot (A_{Bp} - (D_{OR} - 2 \cdot P_{D1st} - P_{Dia}) \cdot tg(\alpha_B)) \leq I_S$$

$$\text{where:} \leq 1.4 \cdot (A_{Bp} - (D_{OR} - 2 \cdot P_{D1st} - P_{Dia}) \cdot tg(\alpha_B))$$

$A_{Bp}$ is the axial distance between the geometric centres of the balls 9 engaging the two different races 10 of said pair of races 10, between the two ball bearings, $D_{OR}$ is as defined above, $P_{D1st}$ is as defined above, that is calculated using relationship [04], and $P_{Dia}$ and $\alpha_B$ are as defined above.

Relationship [05] above therefore implies that the spacing between centre lines $I_S$ between the two sensors S in the axial direction must always be between 0.8 and 1.4 times the difference between the axial distance between the primitive diameters of the two rings of rolling elements, that is the balls 9 ($A_{Bp}$) and the projection in the axial direction of the difference between the point of intersection between the directrix defined by the contact angle $(\alpha_B)$ and the surface 13 of the outer ring 5 less the depth of the recess 12 under consideration and the primitive diameter of a ring of rolling elements ($P_{Dia}$).

According to a possible variant, which is not illustrated for the sake of simplicity, each recess 12, instead of being rectangular in shape, has an S-shape in plan with a rounded perimeter profile always bounded by a rounded perimeter edge 24 immediately adjacent to the first step 14, so that the pair of metal plates 15 and respective plates 23 housed in each recess 12 are arranged angularly offset from each other. This solution may be advantageous in certain specific mechanical stress situations, depending on the geometry of the suspension assembly 1.

Figure 9:
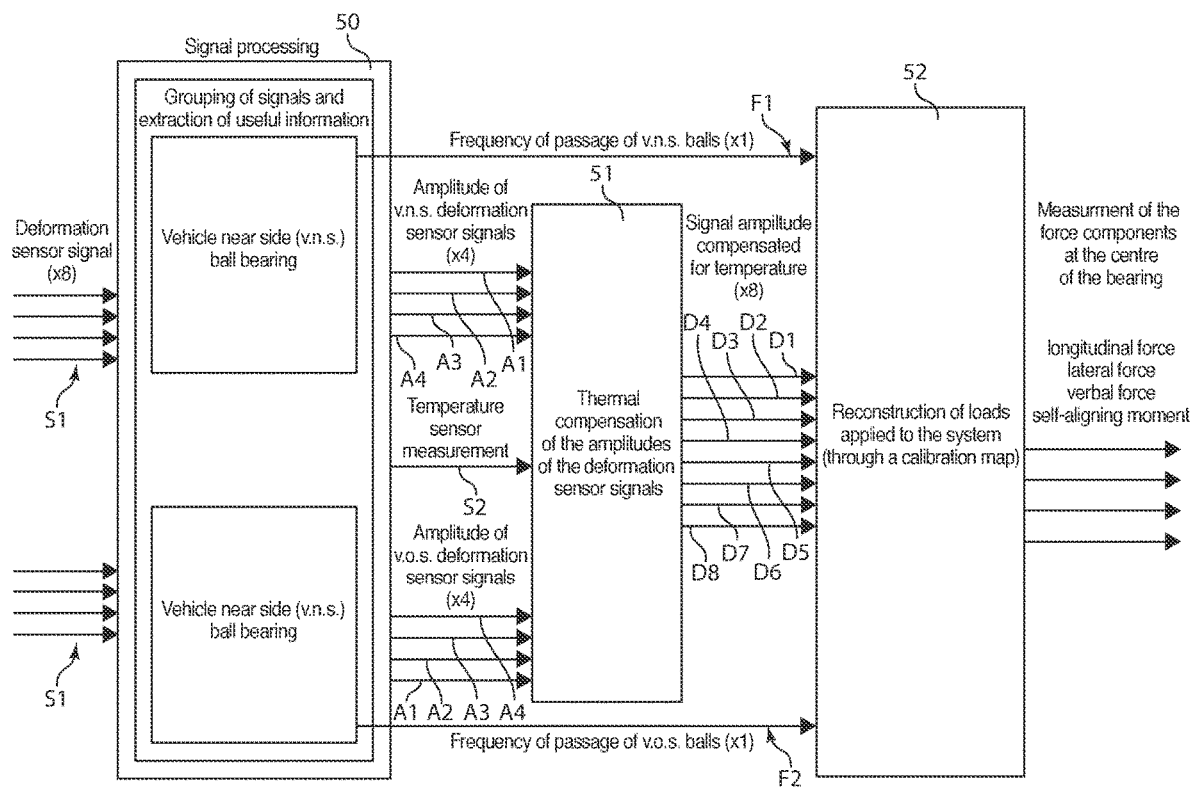
FIG. 9 illustrates a block diagram of the detection method in accordance with this disclosure using the detection system in FIG. 2.

Finally, the detection system 4 comprises an electrical circuit 25 (FIGS. 2 and 4) connected to the opposite extremities of each ceramic plate 23 facing the circumferential extremities 17 of the respective metal plate 15 to collect a first electrical signal S1 relative to each sensor, and then to collect a plurality of signals S1, illustrated by arrows in FIG. 9.

A ceramic plate 23 constituting each load sensor is borne by a first face 26 of the respective metal plate 15 opposite the radially external lateral surface 13 of the outer ring 5 and, as already indicated, the ceramic plate 23 is formed in such a way as to be entirely and always in contact with said first face 26, completely attached to the same, being of one piece with the same, for example printed directly onto the first face 26 of the respective metal plate 15.

According to embodiments in accordance with this disclosure, a detection system 4 further comprises a temperature sensor 27 (FIG. 3) supported by the electrical circuit 25, integral with it and housed in a blind hole 29 formed on the outer lateral surface 13 of the outer ring 5.

As is well illustrated in FIG. 2, the electrical circuit 25 is connected in symmetrically opposite positions in the circumferential direction to opposite extremities of each ceramic plate 23 to collect a plurality of first electrical signals S1 (FIG. 9), each relating to a respective sensor 23; the electrical circuit 25 is also connected to the temperature sensor 27 (with which it is integrally connected) to collect a second electrical signal S2 emitted by the same (FIG. 9).

Figure 4:
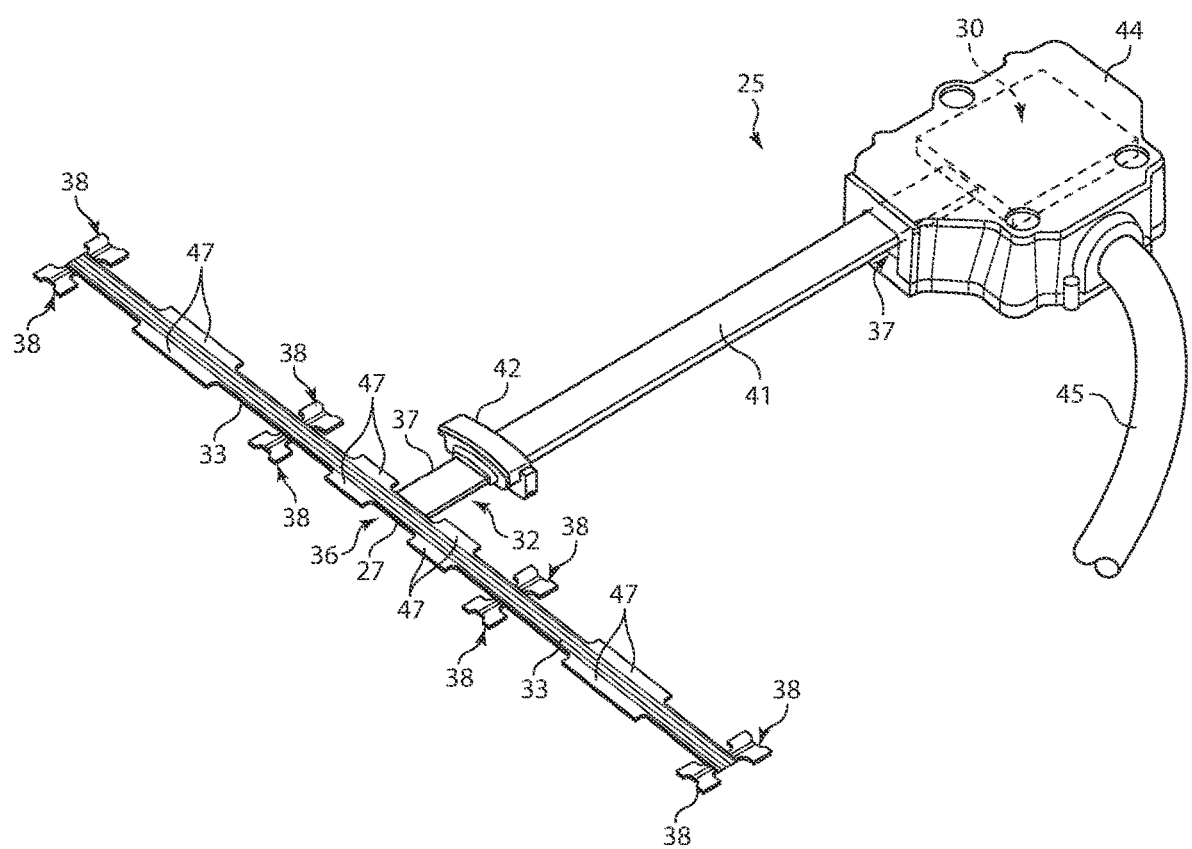
FIG. 4 diagrammatically illustrates a three-quarter front perspective view of some of the main components of the detection system in FIG. 2.

A circuit board 30, illustrated diagrammatically by dashed lines as a block in FIGS. 2 and 4, is connected to one end 31 of the electrical circuit 25 to simultaneously process the first signals S1 relating to each sensor 23 and the second signal S2 relating to the temperature sensor 27 in parallel, as will be seen.

In various embodiments in accordance with this disclosure, illustrated in FIGS. 2 and 4, the electrical circuit 25 consists of a flat T-shaped multipolar conductor 32 comprising two opposite first arms or branches 33 aligned with each other, a middle portion 36 connecting the first arms 33 to each other, which project from the middle portion 36 on opposite sides, and a third arm or branch 37 projecting from the middle portion 36 perpendicularly to the first arms 33.

The first arms 33 bear laterally respective projecting opposite pairs of Y-shaped contacts 38, and each pair of contacts 38 is electrically and mechanically connected to the opposite extremities of a respective ceramic plate 23, preferably by brazing.

Figure 8:
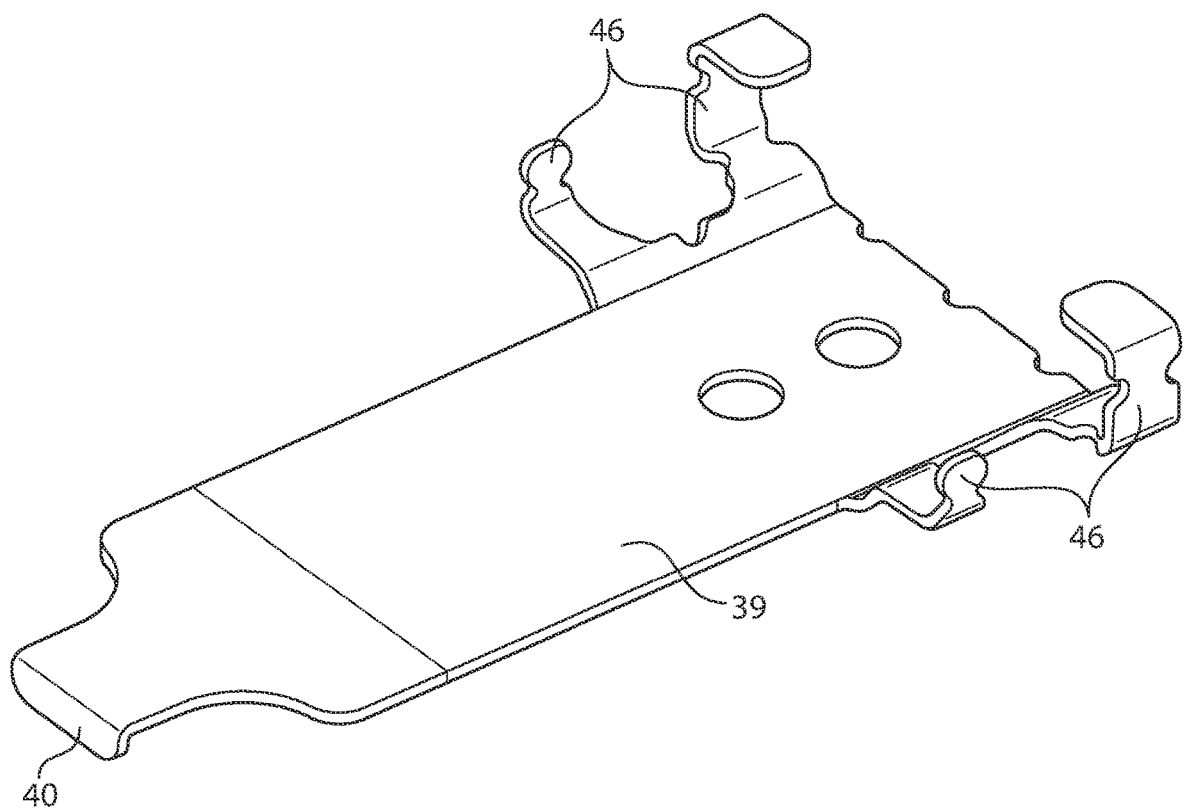

The middle portion 36 includes (FIG. 3) a metal plate 39, illustrated in detail in FIG. 8. The temperature sensor 27 is soldered (brazed) to the flexible circuit formed by the multipolar flat conductor 32 at the metal plate 39, essentially on the middle portion 36 at a position adjacent to the metal plate 39.

On the other hand, the metal plate 39 has the function of centring and mechanically retaining the flexible conductor 32 and a protective rubber overmoulding 42 as illustrated below.

The middle portion 36 is supported on the plate 39 and a section of the arm or branch 37 of the flat conductor 32 is also supported and incorporated immediately adjacent to the middle portion 36.

The metal plate 39 is configured so as to be anchored in the blind hole 29 of the outer ring 5 to house the temperature sensor 27 therein. For this purpose, it includes a hook-shaped end 40 configured to fit into the blind hole 29.

Figure 7:
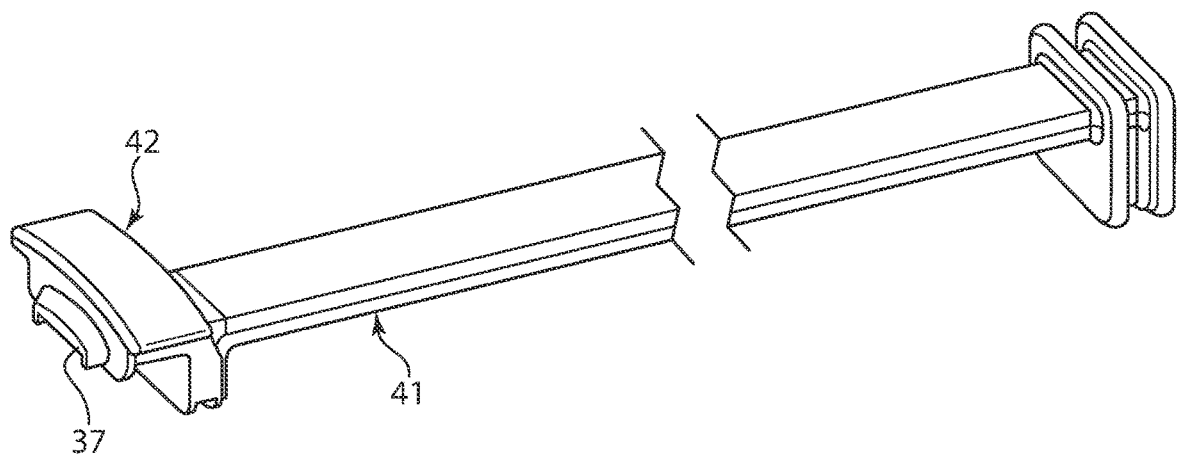
FIGS. 7 and 8 illustrate components of the detection system in FIG. 2 on a larger scale.

The third arm 37 is provided over the middle portion 36 with an integral protective sheath 41 (FIG. 7) of a sealing transverse element 42 overmoulded onto the metal plate 39 and incorporating part of the metal plate 39, configured when in use to fit between the outer lateral surface 13 of the outer ring 5 and the suspension strut or articulation 3 coupled to the wheel hub unit 2.

The protective sheath 41 has the function of protecting the flexible circuit 25 from impacts with stones and aggressive atmospheric agents in the exposed section, as well as having the function of a special seal at the interface between the wheel hub unit 2 and the suspension strut or articulation 3 on one side and with a box 44 on the other side; the latter box houses an offtake to connect the electrical circuit 25 to a cable 45 that can be connected to a vehicle control unit (ECU) or directly houses a data-processing circuit board (30).

The box 44, preferably made by moulding from a synthetic plastics material in the form of two half-shells joined together, for example by screws, is provided in the example illustrated by a side cable 45 configured to connect in a known way, not illustrated for simplicity, with a vehicle control unit or other interface device.

In order to adequately support the sheath 41 together with the sealing element 42, imparting adequate rigidity to it, it is co-moulded onto the plate 39, which is provided with appropriate L-shaped and/or U-shaped brackets 46 from the opposite side to its hook end 40.

In certain embodiments in accordance with this disclosure, the first arms 33 are configured to wrap in a ring around the outer lateral surface 13 of the outer ring 5, within an annular groove 28 therein.

On the side of the outer lateral surface 13 of the outer ring 5, the arms 33 are preferably provided with wings or double-sided adhesive elements 47 having exactly the same transverse dimension as the annular groove 28 in order to be able to exactly centre the arms 33 of the multipolar conductor 32 forming the electrical circuit 25 within the annular groove 28 and, consequently, to precisely position the contacts 38 radially outside and above the ceramic plates 23.

After the outer ring 5 has been manufactured in the conventional way and the recesses 12 have been formed on its external lateral surface 13 with the two concentric steps 14 and 21, generally by chip removal, the metal plates 15, which have already been integrally provided with the piezoresistive ceramic plates 23 that are fully bonded in contact with and completely of one piece with the plates 15 over their entire length or at least all of the centre portion 19, are housed therein, resting their extremities 17 on the step 14.

Then a welding operation or step, preferably performed by laser, is performed between the whole transverse edge of each extremity 17 and the step 14, thus mechanically binding the metal plates 15 to the outer ring 5 in each recess 12 without causing the plates 15 to touch the base wall 22 of the respective recess 12.

Then (or in parallel), the electrical circuit 25 is made with the corresponding T-shaped multipolar flat conductor 32, pre-formed as a set of conducting and insulating and protective layers housing the electrical connecting lines between the sensors, the temperature sensor and the two connectors at the tip of the branch 41 of the flexible conductor or "flex" which connect the flex to the control unit or via a cable (which then goes to the control unit); in this step, the contacts 38 can be made of one piece with the conductor 32, by moulding, or be attached to it later. In this step, the components assembled on the flex are eight sensors, a temperature sensor and two "board to board" connectors, which are all soldered to the flex by a soldering operation in a controlled oven using a "pick and place" machine and a thermal "reflow" treatment (typical of electronic applications), so that eventually every Y-contact, which electrically configures a pair of opposite contacts electrically insulated from each other, is connected to the respective internal conductor wires/lines (not illustrated for simplicity) of the multipolar conductor 32.

A final process of rubber overmoulding of the sheath 41 provides protection and insulation for the flexible circuit 25 (as described above). At this point the flex/sensors/protection sub-assembly is ready for assembly onto the outer ring 5, by inserting the branches or arms 33 within the annular groove 28 so that the extremity 40 of the plate 39 is positioned within the blind hole 29. It is then possible to proceed with the operation of laser welding the piezoresistive metal sensors to the already-connected flexible circuit 25 by welding the opposite extremities 17 to the edges of the recesses 12 and thus also attaching the entire circuit 25 to the ring 5.

This is a very delicate operation, and in order to carry it out on an industrial scale it is necessary to select specific dimensional design parameters for the sensors (formed by the plates 23 incorporated onto the plates 15), as described below, in order not to damage them during the laser welding operation.

The flexible circuit 25 has the function of electrically connecting the sensors to a connector or the cable 45 and then to the vehicle ECU for data processing.

A box 44 may be connected to the conductor 32 and its sheath 41 either before or after this step.

At this point, a detection system 4 in accordance with this disclosure is ready and is fully integrated with the outer ring 5, of one piece with its outer lateral surface 13, and a calibration step can be performed immediately after the wheel hub unit 2 has been completely assembled by mounting the rolling elements 9 in the ring 5 of the flanged hub 6, so that after this calibration step the sensorised wheel hub unit 2 in accordance with this disclosure constitutes a fully plug-in sensorised unit which no longer requires any calibration by the vehicle assembler.

From what has been described so far, some embodiments in accordance with this disclosure also relate to a method for the detection of stresses on wheels comprising the steps of placing a fixed number of load sensors 23 on the outer lateral surface 13 of an outer ring 5 of a wheel hub unit 2, collecting first electrical signals S1 associated with the load sensors 23 in real time and processing the first electrical signals S1 by, for example, the circuit board 30.

However, the load sensors consist of the plates 23 of piezoresistive ceramic material of one piece with the respective metal plates 15, in a longitudinal direction with respect to the same and circumferential with respect to the outer ring 5. Furthermore, only the opposite extremities 17 of the metal plates 15 are welded to the outer ring 5 and the welding is oriented in an axial direction with respect to the ring 5 itself.

A method in accordance with this disclosure therefore comprises the step of positioning the ceramic plates 23 on the metal plates 15 and housing the metal plates 15 within respective concave recesses 12, welding them to the same at opposite extremities, the recesses 12 having previously been formed in the outer lateral surface 13 of the outer ring 5 in relation to the respective races 10 for the rolling elements 9.

These steps are performed so that there results a predetermined gap between each metal plate 15. In particular, a predetermined gap is formed between the narrow middle portion 19 thereof, and a base wall 22 of each recess 12.

The following steps are then carried out using the electrical circuit 25 and a suitably programmed circuit board 30.

Firstly, and with reference to FIG. 9, a first step 50 (indicated as a block in FIG. 9) is performed within the circuit board 30 in which all the first electrical signals S1 relating to the same race 10 are analysed in a comparative way and in real time.

This analysis is performed for both amplitude and frequency, since the electrical signals S1 are pseudo-sinusoidal; in fact the signals S1 show strong variations in both frequency and amplitude when in use due to variations in vehicle speed and the different manoeuvres performed by the vehicle respectively.

When the rolling elements 9 pass over the recesses 12 during the rotation of the flanged hub 6 (which is connected to a vehicle wheel), they place the ceramic plates 23 under tension; the plates 23, which in theory should not also flex thanks to the gap mentioned, in reality flex anyway because of the unavoidable asymmetry of the welding zones with respect to the neutral line of each plate 15. However, because it is impossible for them to touch the outer ring 5 as a result of this bending, specifically because of the predetermined gap between plate 15 and based wall 22 discussed above, uncontrollable touch/no-touch situations with consequent unwanted voltage peaks that would make the use of the system impossible are prevented.

Since the ceramic plates 23 are made of a piezoresistive material, they change their electrical resistance in proportion to the voltage applied to them, a voltage which, due to the positioning of the plates 23 described, is circumferentially oriented, that is exactly in the direction in which the races 10 extend.

The electrical signals S1 therefore have a pseudo-sinusoidal pattern (that is a substantially sinusoidal pattern but irregular in amplitude) of frequency proportional to the number of rolling elements 9 and the rotation speed of the flanged hub 6, and of intensity, that is signal amplitude, depending on/proportional to the strength and direction of the applied voltage. In particular, the signal S1 will be positive for voltages applied to the respective plate 23 that are greater than the preloading to which the wheel hub unit 2 is subjected when in use, and will be negative when the voltage applied to the plates 23 is in a direction and of a strength such as to relax these from the preloading.

The signal S1 therefore changes from negative to positive values as increasing mechanical stress is applied to the plates 23.

The metal plates 15 also provide a secure and effective anchorage for the plates 23 onto the outer lateral surface 13.

The narrow middle portion 19 amplifies the electrical signals S1 associated with each load sensor 23.

In the first step 50, a frequency value F1 for one of the races 10 and F2 for the other race 10, equal to the frequency of the first signals S1 having the maximum amplitude, are therefore determined, and as many amplitude values A1-An as there are sensors 23 associated with each race 10 are determined. Having determined a common frequency for the signals S1 relative to the sensors comprising the plates 23 (and the relative plates 15) leading to the same race 10, the maximum amplitude of each signal S1 generated by each sensor is calculated.

In the case of the example illustrated, as there are four recesses 12 each housing two sensors consisting of a piezoresistive plate 23 anchored onto a metal plate 15, one frequency value F1 or F2 and four amplitude values A1-A4 will be obtained for each of the two races 10 at the output from step 50, that is to say a total of ten values.

Simultaneously and preferably, a second step is performed in which the circumferential temperature of the outer ring 5 is detected by means of the temperature sensor 27 close to or alongside the cylindrical outer lateral surface 13 between the two races 10.

Subsequently, a third step 51 (indicated by a block in FIG. 9) is preferably performed in which the previously determined amplitude values A1-A4 associated with each sensor 23 of each race 10 are corrected according to an extrapolation function previously empirically determined by applying the same mechanical stress to the outer ring 5 at a plurality of different temperatures and determining the maximum amplitude values associated with each sensor 23 for each temperature.

In fact, although the variation in electrical resistance in a piezoresistive material is also a function of temperature, the most appreciable variation in the signals S1, for the same mechanical voltage applied, depends on the variation in the preloading on the elements of the wheel hub unit 2 caused by a change in temperature which produces differential thermal expansion, due in this case to the way the bearing is mounted on the suspension strut 3.

The extrapolation function used in the third step 51, which may consist of an algorithm or an interpolation map, is determined in the calibration step mentioned above, which is to be performed after each sensorised wheel hub unit 2 is completed.

Corrected amplitude values D1-Dn are obtained for each race 10 from the third step 51, in the example illustrated four plus four values, that is eight amplitude values D1-D8 in all, associated with two frequency values F1, F2 as previously processed, for a total of 10 signal values.

In a fourth and final step 52 (indicated by a block in FIG. 9), the temperature-corrected amplitude values D1-D8 and the previously determined frequency values F1, F2 for both races 10 are processed to calculate the forces and moments applied to the outer ring 5 in real time, extrapolating them by means of a calibration function or map.

This calibration map will have been previously determined empirically by applying a plurality of first combinations of known forces and moments to the outer ring 5 and associating a second combination of maximum amplitude and frequency values determined by means of the previous steps with each first combination. This calibration map 58 is also obtained during the calibration step to which each wheel hub unit 2 is subjected as soon as it is completed.

Substantially, in the calibration step, after the relationship between temperature variation and the value which is to be assumed to be the correct value of the signal amplitude for each sensor 23 has been determined, different sets of forces and torques of known modulus and direction are applied to the outer ring 5 and the map points relating the amplitudes and frequencies to the applied loads will be determined using non-linear regression for different rotation speeds of the flanged hub 6; e.g., for a force of 20 kN, a frequency of 20 Hz and amplitude values of 10, 8, 3 and 1 will be determined on a race 10. It can therefore be assumed that when in use the circuit board 30 processes these frequency and amplitude values, a force of 20 kN will have been applied to the outer ring 5.

Through continuing to apply several known sets of forces and/or torques, a plurality of map points 59 having particular associated frequency and signal amplitude values will thus be obtained. Through interpolating between these map points, in use it will therefore be possible to determine all the forces and torques applied to the outer ring 5 at any time in real time. On will appreciate that map 58 may be stored within memory of, e.g., circuit board 30, or, e.g., within memory that is communicably coupled to circuit 30 so that it may be accessed or referenced, e.g., the process illustrated in FIG. 9.

On the basis of the above, it is clear that in some embodiments, the second and third steps can be omitted and it is possible to go from the first to the fourth step directly, dispensing with the calculation of correct amplitude values and using the values selected in the first step A1-An in the fourth step.

Conversely, in other embodiments, the second and third steps described above will also be performed.

In this case, the amplitude values (A1-An) associated with each sensor and previously determined in step a) will be corrected using two correction functions: an empirically calculated thermal correction depending on the temperature detected in the second step and a correction to the frequency previously calculated for each race in order to determine corrected amplitude values D1-Dn; subsequently, the fourth step will be performed, but with processing the corrected amplitude values D1-Dn to calculate the forces and moments applied to the outer ring 5 in real time, extrapolating them using a map previously determined empirically through a non-linear regression function.

In this way, during the normal operation of the wheel hub unit 2, the longitudinal, lateral and vertical forces applied to the outer ring 5 when running, as well as the self-aligning torque or moment, can be determined with a suitable number of available recesses 12.

This information, that is the values of the forces and moments acting on the outer ring 5 calculated in step 52, will then be provided to the vehicle control unit via the cable 45 in real time, and the unit will be able to use them to improve functions of the vehicle control unit. For example, such functions include as ABS, ESP, ECU, vehicle dynamics, engine control, suspension control, and the like.

The object of the present disclosure is to provide a sensorised wheel hub unit and an associated system and method for real-time, accurate and reliable detection of the magnitude of applied forces and moments, that is the loads to which a vehicle is subjected when driven, and which are at the same time easy for the vehicle manufacturer to implement.

According to the disclosure, a sensorised wheel hub unit and an associated detection system and method having the characteristics set out in the appended claims are therefore provided. All the aims of this disclosure are therefore achieved.

For example, in some embodiments, a sensorised wheel hub unit including a system for detecting mechanical stress and including a rolling bearing bounded radially by an outer surface and provided radially on the inside with at least one annular race for rolling elements; in which the detection system comprises a plurality of zones of elastic deformation defined by respective angularly spaced longitudinal recesses axially formed on the outer surface of the outer ring, each recess extending over a circumferential length of the annular race; wherein the detection system in additionally includes: a first annular step formed peripherally within each recess along the whole perimeter (P) of the same and in a position immediately adjacent to the perimeter (P); at least one metal plate located transversely within each recess, aligned in a circumferential direction to the annular race, circumferentially opposite extremities of the metal plate being welded to opposite lateral sides of the first step; a hollow formed centrally within each recess and bounded perimeterally by the first annular step so as to form a second step inside the first step, delimiting a base wall of the recess, the metal plate spanning the hollow so as to be spaced apart from, and never touch, the base wall of the recess; a sensor consisting of a plate of piezoresistive ceramic material made to be of one piece with the metal plate, spanning the hollow; and an electrical circuit connected to opposite extremities of the ceramic plate facing the circumferential extremities of the metal plate to collect an electrical signal (S1) relative to each sensor.

In further example, in some embodiments, a system for real-time detection of the forces and moments applied to a wheel hub unit including an outer ring radially provided on the inside with a pair of annular races for rolling elements includes: a plurality of longitudinal recesses axially formed in an outer lateral surface of the outer ring, spaced angularly apart from each other, each recess extending both axially and in a circumferential direction over both the annular races, the recesses being configured to define zones of localised elastic deformation in the outer ring; a first step, of annular shape in plan, formed peripherally within each recess along the whole perimeter of the same; a pair of metal plates located transversely within each recess, each aligned circumferentially with a respective annular race, circumferentially opposite extremities of the metal plates being welded to opposite lateral sides of the first step; a hollow formed centrally within each recess and bounded perimeterally by the first annular step (14) so as to form a second step inside the first step, delimiting a base wall of the recess, the metal plates spanning the respective hollow so as to be spaced apart from, and never touch, the base wall of the recess; a plurality of respective sensors consisting of plates of piezoresistive ceramic material made to be of one piece with the metal plates on a first face thereof opposite to the radially outer lateral surface of the outer ring; a temperature sensor; an electrical circuit connected in symmetrically opposite positions in the circumferential direction to opposite extremities of each ceramic plate to collect a plurality of first electrical signals (S1), each relating to a respective sensor, the electrical circuit being also connected to the temperature sensor to collect a second electrical signal (S2) emitted by the same; and a circuit board connected to one end of the electrical circuit to simultaneously process the first signals (S1) relating to each sensor and the second signal (S2) relating to the temperature sensor in parallel.

In further example, a method for the detection of stresses on wheels includes the steps of placing a fixed number of load sensors on an outer lateral surface of an outer ring of a wheel hub unit, collecting first electrical signals associated with the load sensors in real time and processing the first electrical signals; such that the step of fitting load sensors requires the prior formation of a plurality of concave recesses on the outer lateral surface of the outer ring over respective rolling races for rolling elements, the forming of plates of piezoresistive ceramic material of one piece with the respective metal plates and housing the metal plates within respective recesses, welded within the same and in such a way that there is a predetermined gap between the metal plates and a base wall of each recess; and in that the method also includes: a) analysing the amplitude and frequency of the first electrical signals (S1) relating to the same race in a comparative way and in real time to determine a frequency value (F1, F2) equal to the frequency of the first signals having maximum amplitude and as many amplitude values (A1-An) as there are sensors associated with that race; and b) processing the maximum amplitude values (A1-An) and frequency values (F1, F2) thus determined to calculate the forces and moments applied to the outer ring in real time, extrapolating them by means of a calibration map previously determined empirically through a non-linear regression function.

The invention claimed is:

1. A sensorised wheel hub unit, comprising:
   a rolling bearing bounded radially by an outer surface and provided radially on the inside with at least one annular race for rolling elements, the rolling bearing including an outer ring;
   a plurality of zones of elastic deformation defined by a respective plurality of angularly spaced longitudinal recesses axially formed on the outer surface of the outer ring, wherein each recess extends over a circumferential length of the at least one annular race;
   a first annular step formed peripherally within at least one of the angularly spaced longitudinal recesses;
   at least one metal plate located transversely within the at least one of the angularly spaced longitudinal recesses, the at least one metal plate aligned in a circumferential direction to the at least one annular race, wherein circumferentially opposite extremities of the at least one metal plate to opposite lateral sides of the first step;
   a hollow formed centrally within each recess and bounded perimeterally by the first annular step so as to form a second step inside the first annular step, the second step delimiting a base wall of the recess;
   a sensor comprising a plate of piezoresistive ceramic material coupled to the at least one metal plate; and
   an electrical circuit connected to opposite extremities of the ceramic plate facing the circumferential extremities of the at least one metal plate to collect an electrical signal (S1) relative to each sensor.

2. The sensorized wheel hub unit of claim 1, wherein the at least one annular race is a pair of annular races axially arranged in tandem; wherein the at least one metal plate located within the respective the angularly spaced longitudinal recesses includes a pair of metal plates arranged parallel to each other and circumferentially in relation to the pair of races.

3. The sensorized wheel hub unit of claim 2, wherein the plate of piezoresistive ceramic material of the sensor is supported by a first face of the respective at least one metal plate opposite the outer lateral surface of the outer ring, the plate of piezoresistive ceramic material being disposed on the respective at least one metal plate so as to be entirely and always in contact with the first face, completely of one piece with the metal plate.

4. The sensorized wheel hub unit of claim 3, wherein the plate of piezoresistive ceramic material is printed directly onto the first face.

5. The sensorized wheel hub unit of claim 4, wherein the angularly spaced longitudinal recesses is S-shaped with a rounded perimeter edge immediately adjacent to the first step, so that the pair of metal plates are angularly offset from each other.

6. The sensorized wheel hub unit of claim 2, wherein the angularly spaced longitudinal recesses is S-shaped with a rounded perimeter edge immediately adjacent to the first step, so that the pair of metal plates are angularly offset from each other.

7. The sensorized wheel hub unit of claim 1, wherein the plate of piezoresistive ceramic material of the sensor is supported by a first face of the respective at least one metal plate opposite the outer lateral surface of the outer ring, the plate of piezoresistive ceramic material being disposed on the respective at least one metal plate so as to be entirely and always in contact with the first face, completely of one piece with the metal plate.

8. The sensorized wheel hub unit of claim 7, wherein the plate of piezoresistive ceramic material is printed directly onto the first face.

9. The sensorized wheel hub unit of claim 1, wherein the angularly spaced longitudinal recesses comprises a substantially rectangular shape with a rounded perimeter profile and is bounded by a flared or rounded perimeter edge immediately adjacent to the first step.

10. The sensorized wheel hub unit of claim 1, wherein the at least one of the angularly spaced longitudinal recesses of the outer ring is four angularly spaced longitudinal recesses, further wherein the four angularly spaced longitudinal recesses are spaced apart at the same or different angles.

11. A system for real-time detection of the forces and moments applied to a wheel hub unit comprising:
   an outer ring radially provided on the inside with a pair of annular races for rolling elements;
   a plurality of longitudinal recesses axially formed in an outer lateral surface of the outer ring, spaced angularly apart from each other, each of the plurality of longitudinal recesses extending both axially and in a circumferential direction over both the annular races, each of the plurality of longitudinal recesses further defining zones of localised elastic deformation in the outer ring;
   a first step, of annular shape, formed peripherally within at least one of the plurality of longitudinal recesses along the whole perimeter of the at least one of plurality of longitudinal recesses;
   a pair of metal plates located transversely within the at least one of plurality of longitudinal recesses, each metal plate of the pair of metal plates aligned circumferentially with a respective annular race, wherein circumferentially opposite extremities of each metal plate being coupled to opposite lateral sides of the first step;
   a hollow formed centrally within the at least one of plurality of longitudinal recesses, the hollow being bounded perimeterally by the first step so as to form a second step inside the first step, the second step delimiting a base wall of the recess;
   a first sensor including a plate of piezoresistive ceramic material coupled to the at least one metal plate, the plate of piezoresistive ceramic material being made on a first face the at least one metal plate opposite to a radially outer lateral surface of the outer ring;
   a temperature sensor;
   an electrical circuit connected in symmetrically opposite positions in the circumferential direction to opposite extremities of the plate of piezoresistive ceramic material, wherein the electric circuit is further connected to opposite extremities of a plurality of other plates of piezoresistive ceramic material to collect a plurality of first electrical signals (S1), each relating to a respective sensor of a plurality of sensors, including the first sensor, the electrical circuit being also connected to the temperature sensor to collect a second electrical signal (S2) emitted by the temperature sensor; and
   a circuit board connected to one end of the electrical circuit to simultaneously process the first signals (S1) relating to each of the plurality of sensors and the second signal (S2) relating to the temperature sensor in parallel.

12. The system of claim 11, wherein the electrical circuit consists of a flat T-shaped multipolar conductor comprising two opposite first arms aligned with each other, a middle portion connecting the first arms to each other, which first arms project from the middle portion on opposite sides, and a third arm projecting from the middle portion perpendicularly to the first arms; the first arms bearing laterally respective projecting opposite pairs of contacts, each pair of contacts being electrically and mechanically connected to the opposite extremities of a respective ceramic plate.

13. The system of claim 12, wherein the middle portion includes a metal plate adjacent to the temperature sensor configured so as to be anchored in a blind hole on the outer ring to house the temperature sensor therein; and in that the third arm is provided over the middle portion with an integral protective sheath of a sealing transverse element incorporating part of the metal plate and configured when in use to fit between the outer lateral surface of the outer ring and a suspension strut or articulation coupled to the wheel hub unit; the protective sheath mechanically connecting the third arm with a box housing an offtake to connect the electrical circuit to a cable that can be connected to a vehicle control unit (ECU) or to a circuit board housed in the box.

14. The system of claim 13, wherein the first arms are configured to wrap in a ring around the outer surface of the outer ring, within an annular groove therein and, on the side of the outer lateral surface of the outer ring, are preferably provided with wings and/or double-sided adhesive elements having exactly the same transverse dimension as the annular groove.

* * * * *